US010671406B2

United States Patent
Huang

(10) Patent No.: US 10,671,406 B2
(45) Date of Patent: Jun. 2, 2020

(54) SERVER FOR AUTOMATICALLY DETERMINING WHETHER TO ENABLE REMOTE CONTROL FUNCTION AND METHOD FOR AUTOMATICALLY ENABLING REMOTE CONTROL FUNCTION

(71) Applicant: MITAC COMPUTING TECHNOLOGY CORPORATION, Taoyuan (TW)

(72) Inventor: Chia-An Huang, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 115 days.

(21) Appl. No.: 16/026,935

(22) Filed: Jul. 3, 2018

(65) Prior Publication Data

US 2019/0114179 A1    Apr. 18, 2019

(30) Foreign Application Priority Data

Oct. 18, 2017    (TW) .............................. 106135789 A

(51) Int. Cl.
```
G06F 9/24       (2006.01)
G06F 9/4401     (2018.01)
G06F 11/30      (2006.01)
H04L 29/08      (2006.01)
G06F 9/38       (2018.01)
```
(52) U.S. Cl.
CPC .............. *G06F 9/4411* (2013.01); *G06F 9/38* (2013.01); *G06F 11/3055* (2013.01); *H04L 67/025* (2013.01); *G06F 9/4401* (2013.01)

(58) Field of Classification Search
CPC ...... G06F 9/4411; G06F 9/38; G06F 11/3055; H04L 67/025
USPC ............................................................ 713/1
See application file for complete search history.

(56) References Cited

U.S. PATENT DOCUMENTS

| 6,415,324 B1 * | 7/2002 | Cromer ................... H04L 67/42 709/208 |
| 2003/0088655 A1 * | 5/2003 | Leigh ................... H04L 41/0893 709/223 |
| 2004/0215617 A1 * | 10/2004 | Ramsey .................... G06F 1/26 |

(Continued)

FOREIGN PATENT DOCUMENTS

| TW | 201033805 A | 9/2010 |
| TW | 201621644 A | 6/2016 |

OTHER PUBLICATIONS

Taiwan Patent Office, Office Action, Patent Application Serial No. TW106135789, dated Jun. 19, 2018, Taiwan.

*Primary Examiner* — Volvick Derose
(74) *Attorney, Agent, or Firm* — Rabin & Berdo, P.C.

(57) ABSTRACT

A server for automatically determining whether to enable a remote control function and a method for automatically enabling the remote control function are provided. The method for automatically enabling the remote control function includes: executing, by a board management controller (BMC), a firmware program to determine a logic level of a general-purpose input/output (GPIO) pin of the BMC; enabling, by the BMC, a remote control function according to a first logic level of the GPIO pin; and skipping enabling, by the BMC, the remote control function according to a second logic level of the GPIO pin.

12 Claims, 2 Drawing Sheets

(56) References Cited

U.S. PATENT DOCUMENTS

| | | | |
|---|---|---|---|
| 2007/0220301 A1* | 9/2007 | Brundridge | G06F 11/2028 714/4.1 |
| 2007/0234124 A1* | 10/2007 | Chen | G06F 9/44505 714/36 |
| 2007/0271360 A1* | 11/2007 | Sahita | G06F 21/577 709/223 |
| 2008/0005415 A1* | 1/2008 | Lopez | G06F 13/385 710/62 |
| 2010/0180054 A1* | 7/2010 | Coletrane | G06F 13/385 710/51 |
| 2012/0047307 A1* | 2/2012 | Tu | G06F 21/79 710/311 |
| 2012/0137035 A1* | 5/2012 | Peng | G06F 13/105 710/262 |
| 2012/0159035 A1* | 6/2012 | Yin | G06F 13/385 710/316 |
| 2013/0007430 A1* | 1/2013 | Fan | G06F 9/445 713/1 |
| 2013/0024719 A1* | 1/2013 | Zhang | H04L 41/0659 714/4.11 |
| 2013/0163437 A1* | 6/2013 | Gao | G06F 11/2289 370/242 |
| 2014/0218199 A1* | 8/2014 | Cepulis | H04L 41/24 340/635 |
| 2017/0373505 A1* | 12/2017 | Luo | H01H 47/00 |
| 2018/0165455 A1* | 6/2018 | Liguori | G06F 21/575 |
| 2019/0171464 A1* | 6/2019 | Karpagavinayagam | G06F 9/4411 |

* cited by examiner

SERVER FOR AUTOMATICALLY DETERMINING WHETHER TO ENABLE REMOTE CONTROL FUNCTION AND METHOD FOR AUTOMATICALLY ENABLING REMOTE CONTROL FUNCTION

CROSS-REFERENCE TO RELATED APPLICATION

This non-provisional application claims priority under 35 U.S.C. § 119(a) to Patent Application No. 106135789 filed in Taiwan, R.O.C. on Oct. 18, 2017, the entire contents of which are hereby incorporated by reference.

BACKGROUND

Technical Field

The present invention relates to a server, and in particular, to a server for automatically determining whether to enable a remote control function and a method for automatically enabling the remote control function.

Related Art

Generally, a server has a board management controller (BMC), and the BMC can monitor all events of the server and any action of the server, so that a user can manage the server through the BMC. Furthermore, some BMCs support a remote control function, and users can connect to the BMCs of the servers at a remote terminal through the network by using the remote control function, so as to manage the servers. This is quite convenient.

However, according to different needs of the users of the servers, some users may not need the remote control function. In this case, designers of the servers need to provide customized servers according to the different needs. For example, when a customer of a server does not need the remote control function, a designer needs to modify the firmware program of the server to another firmware program that does not support the remote control function. When the other customer of the other server needs the remote control function, a designer needs to modify the firmware of the other server to the other firmware program that supports the remote control function. This is quite labor-consuming and causes low efficiency of manufacturing the servers. Furthermore, it is error-prone when the firmware is manually modified. For example, the designer modifies the firmware of a mainboard that does not support the remote control function to the other firmware program that supports the remote control function, or modifies the firmware of a mainboard that supports the remote control function to the other firmware program that does not support the remote control function.

SUMMARY

In view of this, the present invention provides a server for automatically determining whether to enable a remote control function and a method for automatically enabling the remote control function.

In an embodiment, a server for automatically determining whether to enable a remote control function includes a storage unit and a BMC that is electrically connected to the storage unit. The storage unit stores a firmware program. The BMC includes an input/output pin, and the BMC executes the firmware program to determine a logic level of the input/output pin, and the logic level is one of a first logic level and a second logic level. After the determining, the BMC enables a remote control function according to a first logic level of the input/output pin, and the BMC skips enabling the remote control function according to a second logic level of the input/output pin.

In an embodiment, after the BMC is powered on or reset, the firmware program is executed by the BMC in an initialization stage to determine the logic level of the input/output pin.

In an embodiment, when the input/output pin has the first logic level, the BMC adds a flag, and after adding the flag, the BMC enables the remote control function.

In an embodiment, when the input/output pin has the second logic level, the BMC determines whether a flag exists, and when the flag exists, the BMC deletes the flag to skip enabling the remote control function.

In an embodiment, when the input/output pin has the first logic level, the BMC adds a flag, and after adding the flag, determines whether the flag exists, to enable the remote control function.

In an embodiment, a method for automatically enabling a remote control function is provided, suitable to a server. The method for automatically enabling a remote control function includes: executing, by a BMC, a firmware program to determine a logic level of a general-purpose input/output (GPIO) pin of the BMC; enabling, by the BMC, a remote control function according to a first logic level of the GPIO pin; and skipping enabling, by the BMC, the remote control function according to a second logic level of the GPIO pin.

In an embodiment, in the foregoing step, after the BMC is powered on or reset, the firmware program is executed by the BMC in an initialization stage to determine the logic level of the GPIO pin.

In an embodiment, the step of enabling a remote control function according to a first logic level includes: adding, by the BMC, a flag when the input/output pin has the first logic level; and enabling, by the BMC after adding the flag, the remote control function according to the flag that exists.

In an embodiment, the step of skipping enabling the remote control function according to a second logic level includes: determining, by the BMC when the input/output pin has the second logic level, whether a flag exists; deleting, by the BMC, the flag when the flag exists; and skipping enabling, by the BMC, the remote control function after deleting the flag.

In an embodiment, the step of enabling a remote control function according to a first logic level includes: adding, by the BMC, a flag when the input/output pin has the first logic level; and determining, by the BMC after adding the flag, whether the flag exists, to enable the remote control function.

Based on the above, in embodiments of the server for automatically determining whether to enable a remote control function and a method for automatically enabling the remote control function according to the present invention, the BMC may automatically determine, according to the firmware program, whether the remote control function needs to be enabled. According to different user needs, a designer does not need to modify and design multiple firmware programs corresponding to the different needs one by one, and the designer only needs to design one firmware program that matches an input/output pin having different logic levels. Therefore, execution of the single firmware program can satisfy the different user needs, and a quantity of firmware programs that need to be manufactured is greatly reduced, thereby improving work efficiency and reducing a risk of errors due to manually modifying the firmware program or incorrectly programming the firmware program of an incorrect version.

DETAILED DESCRIPTION

Figure 1:
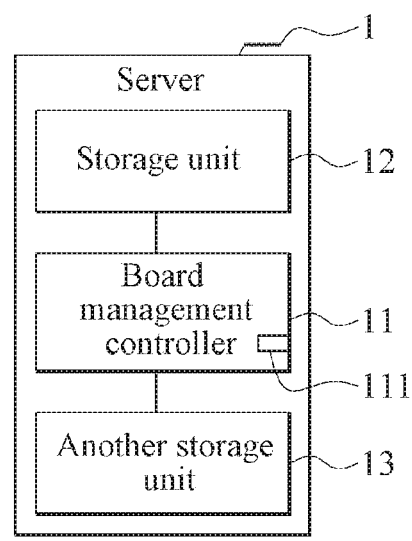
FIG. 1 is a function block diagram of an embodiment of a server for automatically determining whether to enable a remote control function according to the present invention.

FIG. 1 is a function block diagram of an embodiment of a server for automatically determining whether to enable a remote control function according to the present invention. Referring to FIG. 1, a server 1 includes a BMC 11 and a storage unit 12, and the BMC 11 is coupled to the storage unit 12. The BMC 11 includes a GPIO pin 111. The BMC 11 may enable or disable the remote control function to control the respective servers to support or not support the remote control function. The storage unit 12 stores a firmware program that is suitable to the BMC 11, and the firmware program includes program code that is executed to reads the GPIO pin 111 and determines a logic level of the GPIO pin 111, and the program code that is executed to determines, according to the logic level of the GPIO pin 111, whether to enable the remote control function. During operation, the BMC 11 may determine the logic level of the GPIO pin 111 according to the program code, and determine, according to the logic level of the GPIO pin 111, whether to enable the remote control function. In an embodiment, the remote control function is a remote keyboard video mouse (KVM) control function.

Figure 2:
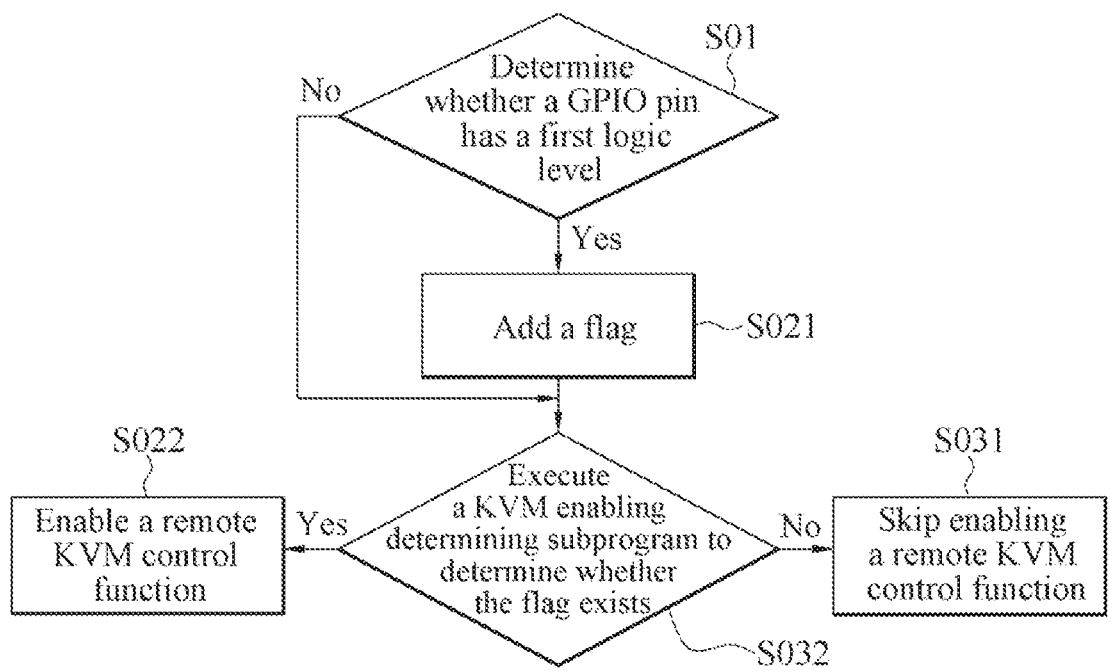
FIG. 2 is a flowchart of an embodiment of a method for automatically enabling a remote control function according to the present invention.

FIG. 2 is a flowchart of an embodiment of a method for automatically enabling a remote control function suitable to the server 1 in FIG. 1. For operation, refer to FIG. 1 in combination with FIG. 2. After a power supply of the BMC 11 is powered on or after the BMC is reset because of a firmware update of the BMC or any factor, the BMC 11 may execute the firmware program in the storage unit 12 to execute in an initialization stage, and read and determine the logic level of the GPIO pin 111 in the initialization stage. As shown in FIG. 2, the BMC 11 determines whether the GPIO pin 111 has a first logic level (step S01). When the GPIO pin 111 has the first logic level (a determining result is "yes"), the BMC 11 enables the remote KVM control function according to the GPIO pin 111 that has the first logic level (step S022). On the other hand, when the BMC 11 determines that the GPIO pin 111 does not have the first logic level (the determining result is "no"), for example, when the GPIO pin 111 has a second logic level, the BMC 11 skips enabling the remote KVM control function according to the GPIO pin 111 that has the second logic level (step S031).

For example, the first logic level and the second logic level may respectively be "1" and "0". When the logic level of the GPIO pin 111 is "1", the determining result of the BMC 11 is "yes", and the BMC 11 enables the remote KVM control function according to the GPIO pin 111 with "1". When the logic level of the GPIO pin 111 is "0", the determining result of the BMC 11 is "no", and the BMC 11 skips enabling the remote KVM control function according to the GPIO pin 111 with "0". On this basis, the BMC 11 may determine, according to the firmware program, whether to enable the remote KVM control function. A designer does not need to modify the firmware program according to different user needs, thereby greatly reducing a risk of errors due to manually modifying the firmware, and management and incorrect programming of different versions of firmware.

In practice, a to-be-executed firmware program of the BMC 11 is stored in a flash memory. After the BMC 11 is powered on, the BMC 11 loads and stores the to-be-executed firmware program that is stored in the flash memory into a random access memory (RAM) that is connected to the BMC 11, to be executed by the BMC 11. On this basis, the storage unit 12 may be the RAM. The BMC 11 executes the firmware program in the storage unit 12, to read the GPIO pin 111, and stores a read result in the RAM by using a parameter, and then further reads the parameter that is in the RAM and that corresponds to the GPIO pin 111, to determine the logic level of the GPIO pin 111 and enable or skip enabling the remote KVM control function according to the logic level of the GPIO pin 111. Alternatively, the storage unit 12 may include the RAM and the flash memory. The BMC 11 loads the to-be-executed firmware program from the flash memory into the RAM, and reads the RAM to determine the logic level of the GPIO pin 111, to enable or skip enabling the remote KVM control function.

In an embodiment, the designer may design the logic level of the GPIO pin 111 according to needs of a user. An example in which the first logic level and the second logic level are respectively "1" and "0" is used. When the user needs to use the remote KVM control function, the designer may design the logic level of the GPIO pin 111 as "1", and when the user does not need to use the remote KVM control function, the designer may design the logic level of the GPIO pin 111 as "0". In this way, the BMC 11 can correctly enable or skip enabling the remote KVM control function according to a preset logic level of the GPIO pin 111.

In an embodiment, the initialization stage of the firmware that is executed by the BMC 11 includes multiple different phases. When executing the firmware in the initialization stage, by the BMC 11, in a first phase of the initialization stage, a KVM flag setting subprogram of the firmware program of the BMC 11 is executed, to read and determine the logic level of the GPIO pin 111, and executes, in a second phase that is executed later than the first phase, a KVM enabling determining subprogram of the firmware program of the BMC 11 is executed, to determine whether to enable the remote KVM control function. To be in accordance with the foregoing execution order, after the BMC 11 determines, in the first phase, the logic level of the GPIO pin 111, the BMC 11 may selectively add a flag according to the logic level of the GPIO pin 111, and when entering the second phase, determine, according to whether the flag exists, whether to enable the remote KVM control function. Specifically, as shown in FIG. 2, when the BMC 11 determines, in the first phase, that the GPIO pin 111 has the first logic level (the determining result is "yes"), the BMC 11 may add a flag (step S021). When entering the second phase, the BMC 11 executes the KVM enabling determining subprogram to determine whether the flag exists (step S032). The BMC 11 has added the flag in step S021. In this case, the BMC 11 determines that the flag exists (the determining result is "yes"), and the BMC 11 further enables the remote KVM control function according to a determining result that the flag exists (step S022). On the other hand, when the BMC 11 determines, in the first phase, that the GPIO pin 111 does not have the first logic level (the determining result is "no"), the BMC 11 entering the second phase without adding a flag. When entering the second phase, the BMC 11 performs step S032. In this case, the BMC 11 determines that the flag does not exist (the determining result is "no"), and the BMC 11 further skips enabling the remote KVM control function according to a determining result that the flag does not exist (step S031).

Figure 3:
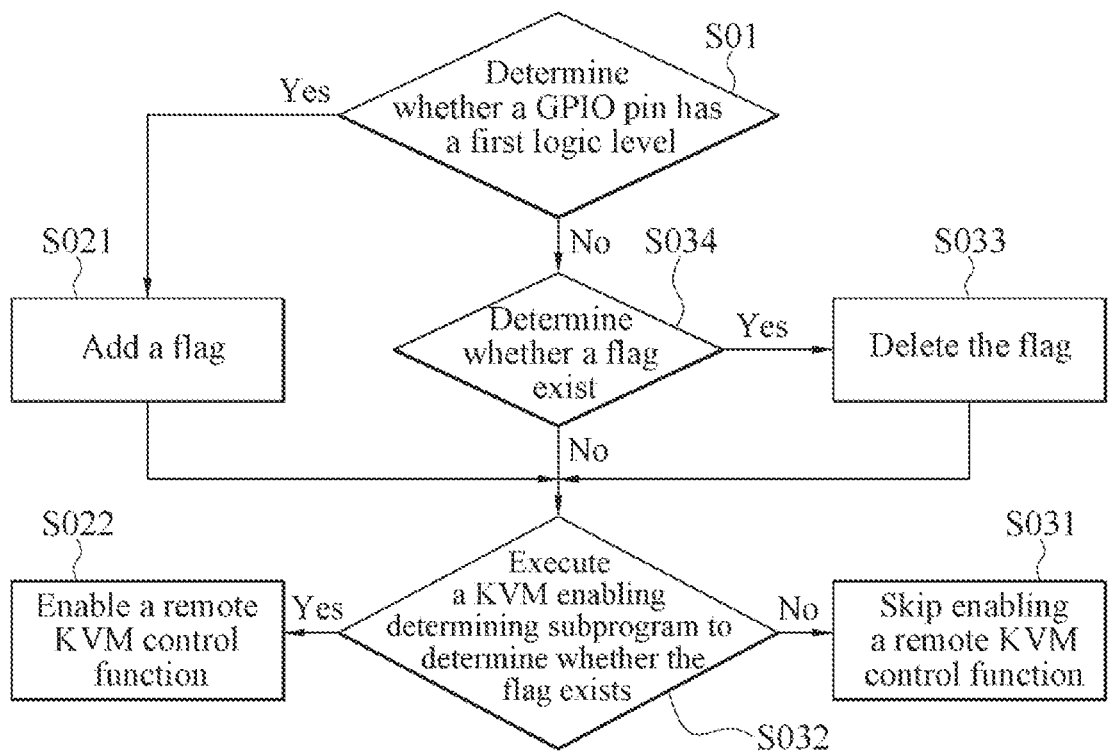
FIG. 3 is a flowchart of another embodiment of a method for automatically enabling a remote control function according to the present invention.

In an embodiment, when the GPIO pin 111 does not have the first logic level, to prevent the BMC 11 when the BMC 11 performs step S032, from incorrectly enabling the remote KVM control function according to a flag that incorrectly exists, before performing step S032, the BMC 11 may first determine whether to delete the flag that incorrectly exists. FIG. 3 is a flowchart of another embodiment of a method for automatically enabling a remote control function suitable to the server 1 in FIG. 1. Referring to FIG. 1 in combination with FIG. 3, when the BMC 11 executes, in the first phase, the KVM flag setting subprogram, if the BMC 11 determines, in step S01, that the GPIO pin 111 does not have the first logic level, the BMC 11 may further determine whether a flag exists (step S034). If the flag exists (a determining result is "yes"), the BMC 11 may delete the flag (step S033). When entering the second phase, the BMC 11 determines, when executing the KVM enabling determining subprogram, that the flag does not exist (the determining result is "no"), to skip enabling the remote KVM control function (step S031). On this basis, when the GPIO pin 111 does not have the first logic level, the BMC 11 may delete a flag that should not exist, to prevent incorrectly enabling, when step S032 is performed, the remote KVM control function according to the flag that incorrectly exists.

In FIG. 3, an example in which the BMC 11 repeatedly performs step S034 and step S032 to determine whether the flag exists is used. In another embodiment, after performing step S034, the BMC 11 may store a determining result refers to that the flag does not exist, and when entering the second phase, skips enabling the remote KVM control function according to the stored determining result that the flag does not exist.

In an embodiment, the server 1 further includes another storage unit 13 coupled to the BMC 11, and the storage unit 13 may be an electrically-erasable programmable read-only memory (EEPROM). When performing step S021, the BMC 11 may add a particular file, for example, a file having a particular file name, in the storage unit 13 as the flag, to represent that the GPIO pin 111 has the first logic level. When performing step S032, the BMC 11 searches the storage unit 13 for the file that refers to the existing of the flag. An example in which the file has the particular file name is used. The BMC 11 may determine, by comparison, whether a file name of each file in the storage unit 13 matches the particular file name. Alternatively, when performing step S021, the BMC 11 may define a flag signal that refers to a high potential, and when performing step S032, determine whether the flag signal matches the status of the defined the high potential, to determine whether the flag exists.

Therefore, after the server 1 enters an operating system (OS), if the BMC 11 supports the remote KVM control function, a user may see, at a remote terminal in a displayed window on a display device that is connected to a connecting port of a console, that the KVM control function corresponding to the BMC 11 is enabled, and the user may connect to the BMC 11 of the server 1 from the remote terminal by using the remote KVM control function, to perform a monitor service, a power on/off service, and the like of the server 1 by using the BMC 11 of the server 1. When the BMC 11 does not support the remote KVM control function, the user cannot see, in the displayed window, that the remote KVM control function is enabled. In this case, the user cannot connect to the server 1 from the remote terminal by using the remote KVM control function.

A person of ordinary skill in the art of the present invention should understand that orders such as the "first" and the "second" in the foregoing "first phase" and "second phase" are not intended to specify that the second phase immediately follows the first phase to be continuously executed, but are used to distinguish two different phases that are executed one after another in the initialization stage of the BMC. For example, the BMC 11 may perform a third phase immediately after performing the first phase, and perform the second phase immediately after the third phase.

Based on the above, in embodiments of the server for automatically determining whether to enable a remote control function and a method for automatically enabling the remote control function according to the present invention, the BMC may automatically determine, according to the firmware program, whether the remote control function needs to be enabled. According to different user needs, a designer does not need to modify and design multiple firmware programs corresponding to the different needs one by one, and the designer only needs to design one firmware program that matches an input/output pin having different logic levels. Therefore, execution of the single firmware program can satisfy the different user needs, and a quantity of firmware programs that need to be manufactured is greatly reduced, thereby improving work efficiency and reducing a risk of errors due to manually modifying firmware or incorrectly programming firmware of an incorrect version.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A server for automatically determining whether to enable a remote control function, comprising:
   a storage unit, storing a firmware program; and
   a board management controller (BMC) with the remote control function, coupled to the storage unit, wherein
   the BMC comprises an input/output pin,
   the BMC executes the firmware program to determine a logic level of the input/output pin,
   the BMC enables the remote control function according to a first logic level of the input/output pin, so as to allow a remote end to connect to the BMC and to control the BMC to perform a monitor service of the server by the remote control function,
   the BMC skips enabling the remote control function according to a second logic level of the input/output pin, so as not to allow the remote end to connect to the BMC by the remote control function, and
   when the input/output pin has the first logic level, the BMC adds a flag, and after adding the flag, the BMC determines whether the flag exists and enables the remote control function according to a determining result that the flag exists.

2. The server according to claim 1, wherein after the BMC is powered on or reset, the firmware program is executed in an initialization program of the BMC to determine the logic level of the input/output pin.

3. The server according to claim 2, wherein when the input/output pin has the second logic level, the BMC determines whether another flag exists, and when the another flag exists, the BMC deletes the another flag to skip enabling the remote control function.

4. The server according to claim 3, wherein after deleting the another flag, the BMC re-determines whether the another flag exists, and skips enabling the remote control function according to another determining result that the another flag does not exist.

5. The server according to claim 2, wherein when the input/output pin has the second logic level, the BMC skips adding the flag, and after skipping adding the flag, skips enabling the remote control function according to another determining result that the flag does not exist.

6. The server according to claim 1, wherein when the input/output pin has the second logic level, the BMC determines whether another flag exists, and when the another flag exists, the BMC deletes the another flag, and after deleting the another flag, re-determines whether the another flag exists, to skip enabling the remote control function according to another determining result that the another flag does not exist.

7. A method for automatically enabling a remote control function, suitable to a server, wherein the method for automatically enabling a remote control function comprises:
    executing, by a board management controller (BMC) with the remote control function, a firmware program to determine a logic level of a general-purpose input/output (GPIO) pin of the BMC;
    enabling, by the BMC, the remote control function according to a first logic level of the GPIO pin, so as to allow a remote end to connect to the BMC and to control the BMC to perform a monitor service of the server by the remote control function, including
        adding, by the BMC, a flag when the GPIO pin has the first logic level, and
        determining, by the BMC after adding the flag, whether the flag exists, and enabling the remote control function according to a determining result that the flag exists; and
    skipping enabling, by the BMC, the remote control function according to a second logic level of the GPIO pin, so as not to allow the remote end to connect to the BMC by the remote control function.

8. The method for automatically enabling a remote control function according to claim 7, wherein after the BMC is powered on or reset, the firmware program is executed in an initialization program of the BMC to determine the logic level of the GPIO pin.

9. The method for automatically enabling a remote control function according to claim 8, wherein the step of skipping enabling the remote control function according to a second logic level comprises:
    determining, by the BMC when the GPIO pin has the second logic level, whether another flag exists;
    deleting, by the BMC, the another flag when the another flag exists; and
    skipping enabling, by the BMC, the remote control function after deleting the another flag.

10. The method for automatically enabling a remote control function according to claim 9, wherein in the step of skipping enabling, by the BMC, the remote control function after deleting the another flag, after deleting the another flag, the BMC re-determines whether the another flag exists, and skips enabling the remote control function according to another determining result that the another flag does not exist.

11. The method for automatically enabling a remote control function according to claim 8, wherein in the step of skipping enabling, by the BMC, the remote control function according to a second logic level of the GPIO pin, the BMC skips adding a flag according to the GPIO pin that has the second logic level, and after skipping adding the flag, skips enabling the remote control function according to a determining result that the flag does not exist.

12. The method for automatically enabling a remote control function according to claim 7, wherein the step of skipping enabling the remote control function according to a second logic level comprises:
    determining, by the BMC when the GPIO pin has the second logic level, whether another flag exists;
    deleting, by the BMC, the another flag when the another flag exists; and
    re-determining, by the BMC after deleting the another flag, whether the another flag exists, to skip enabling the remote control function according to another determining result that the another flag does not exist.

* * * * *